(12) United States Patent
Huang et al.

(10) Patent No.: US 7,382,965 B2
(45) Date of Patent: Jun. 3, 2008

(54) METHOD AND SYSTEM OF VISUAL CONTENT AUTHORING

(75) Inventors: Shu-Cheng Huang, Tainan (TW); Liang-Jin Lin, Taipei (TW)

(73) Assignee: Corel TW Corp., Taipei (TW)

(*) Notice: Subject to any disclaimer, the term of this patent is extended or adjusted under 35 U.S.C. 154(b) by 749 days.

(21) Appl. No.: 10/885,728

(22) Filed: Jul. 8, 2004

(65) Prior Publication Data

US 2006/0008239 A1    Jan. 12, 2006

(51) Int. Cl.
*H04N 5/91* (2006.01)

(52) U.S. Cl. .................................. 386/46; 386/95

(58) Field of Classification Search ............ 386/46, 386/69, 70, 95, 125; 725/34; 707/3, 10, 707/101–104, 511; 345/473, 744, 810, 838; 463/40; 705/511; 710/102, 103, 301, 302
See application file for complete search history.

(56) References Cited

U.S. PATENT DOCUMENTS 6,356,971 B1 *   3/2002   Katz et al. ............. 710/301
6,987,221 B2 *   1/2006   Platt ...................... 84/601
7,136,874 B2 *  11/2006   Mercer et al. ......... 707/104.1
2002/0180803 A1 * 12/2002 Kaplan et al. ............ 345/810
2004/0076402 A1 *  4/2004 Jung et al. ................ 386/69
2004/0223741 A1 * 11/2004 Yoo et al. ................. 386/95

\* cited by examiner

*Primary Examiner*—Thai Q. Tran
*Assistant Examiner*—Mishawn Dunn
(74) *Attorney, Agent, or Firm*—Birch, Stewart, Kolasch & Birch, LLP

(57) ABSTRACT

A method and system for visual content authoring and user interface thereof. An authoring interface, comprising a plurality button controls, is first provided. Required play items are added using the button controls to generate a playlist, and a navigation path is then defined according to the play items and the playlist. Next, the media objects and the navigation path are compiled to generate a disc image file, including a plurality of video clips, each comprising a plurality of PGCs with an unlimited number of playlists and play items.

18 Claims, 26 Drawing Sheets
(22 of 26 Drawing Sheet(s) Filed in Color)

METHOD AND SYSTEM OF VISUAL CONTENT AUTHORING

BACKGROUND OF THE INVENTION

1. Field of the Invention

The present invention relates to visual content authoring, and in particular to a method and system for creating visual content and user interface thereof, capable of generating a playlist for a video disc.

2. Brief Discussion of the Related Art

Conventional video authoring software has many limitations, and examples of which are described in the following.

In the Digital Versatile Disc (DVD)/Video Compact Disc (VCD)/Super Video CD (SVCD) authoring process, navigation paths are defined by writing DVD scripts or using pre-defined actions. Users must be familiar with DVD specifications to write scripts controlling navigation paths, or must limited navigation path function to the predefined actions when an adjustment interface is not provided. Additionally, duplication of the visual content to achieve special DVD/VCD/SVCD navigation paths is storage intension.

For example, the track maker "Story" in Apple's DVD Pro 2.0 only allows creation of 98 stories. The "DVDIt" and "MyDVD" commercial software developed by Sonic Solutions provides a limited number of user defined actions for changing the navigation path. With "Scenarilist" and "ReelDVD" commercial software developed by Sonic Solutions, and other DVD authoring software on the market, users are required to write DVD scripts or use pre-defined scripts to define the navigation paths. Moreover, conventional content authoring engines are scope specific, and as such do not support all formats.

Furthermore, for the DVD navigation path Software Development Kits (SDK), programmers must study DVD/VCD/SVCD specification and write different DVD scripts for different DVD navigation paths, or with different internal play/select lists for VCD/SVCD formats. Thus, navigation path development for different platforms is labor and resource intensive.

Thus, a visual content authoring system capable of ameliorating the described disadvantages is needed.

SUMMARY OF THE INVENTION

Accordingly, an object of the present invention is to provide a method for visual content authoring, enabling creation of DVD/VCD/SVCD navigation paths without requiring knowledge of DVD/VCD/SVCD specifications.

Another object of the invention is to provide a user interface for visual content authoring, providing an method for adding media objects to a playlist.

Another object of the invention is to provide a system for visual content authoring, capable of linking inserted play items using packaged common object models (COM) to reduce development time and system resources.

According to the described object, an embodiment of the present invention provides a method for visual content authoring. An authoring interface, comprising a plurality of button controls, is first provided. Required play items are added to generate a playlist using the button controls and navigation paths are then defined according to the play items and the playlist. Finally, the media objects and navigation paths are compiled to generate a disc image file, including a plurality of video clips, each comprising a plurality of ProGram Chains (PGCs) with unlimited numbers of playlists and play items.

An embodiment of the present invention further provides a system for visual content authoring, comprising a library, a capture unit, a data editor, a data linking unit, and a compiler. The library stores media objects, such as audio, image, and video files, and others as digital visual data files in any suitable standard format. The capture unit captures video data from a video device, such as video camera. The data editor obtains required play items from the library or capture unit and generates a playlist and navigation paths are then defined corresponding to the play items and the playlist.

Each play item is associated with a video clip by assigning a unique ID of the video clip to the play item. The playlist is translated to raw DVD scripts or a playlist/select list complying with VCD/SVCD specification. The navigation path links a menu button to a menu, a button, a title, a chapter, or a media object, and a media object is a video, image, slideshow, audio, or an inputs as digital visual data in any suitable standard format. The compiler compiles the media objects and the navigation path to generate a disc image file, including a plurality of video clips, each comprising a plurality of PGCs with unlimited numbers of playlists and play items.

An embodiment of the present invention further provides a user interface for visual content authoring, comprising a preview window, a content window, a playlist window, and a plurality of button controls. The preview window displays selected play items, the content window displays a title list and menu list, and the playlist window displays a sequence of play items. The play items are dragged from the title or menu list and dropped in the playlist window using the button controls to generate a playlist. A navigation path is built according to the play items and the playlist. The play items and navigation path are compiled to generate a disc image file, including a plurality of video clips.

The user interface further comprises a library, storing the media objects, and a capture unit, capturing video clips from external video devices.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention will become more fully understood from the subsequent detailed description and the accompanying drawings, which are given by way of illustration only, and thus are not limitative of the present invention and wherein.

DETAILED DESCRIPTION

The present invention discloses a method and system for visual content authoring and user interface thereof.

Figure 1:
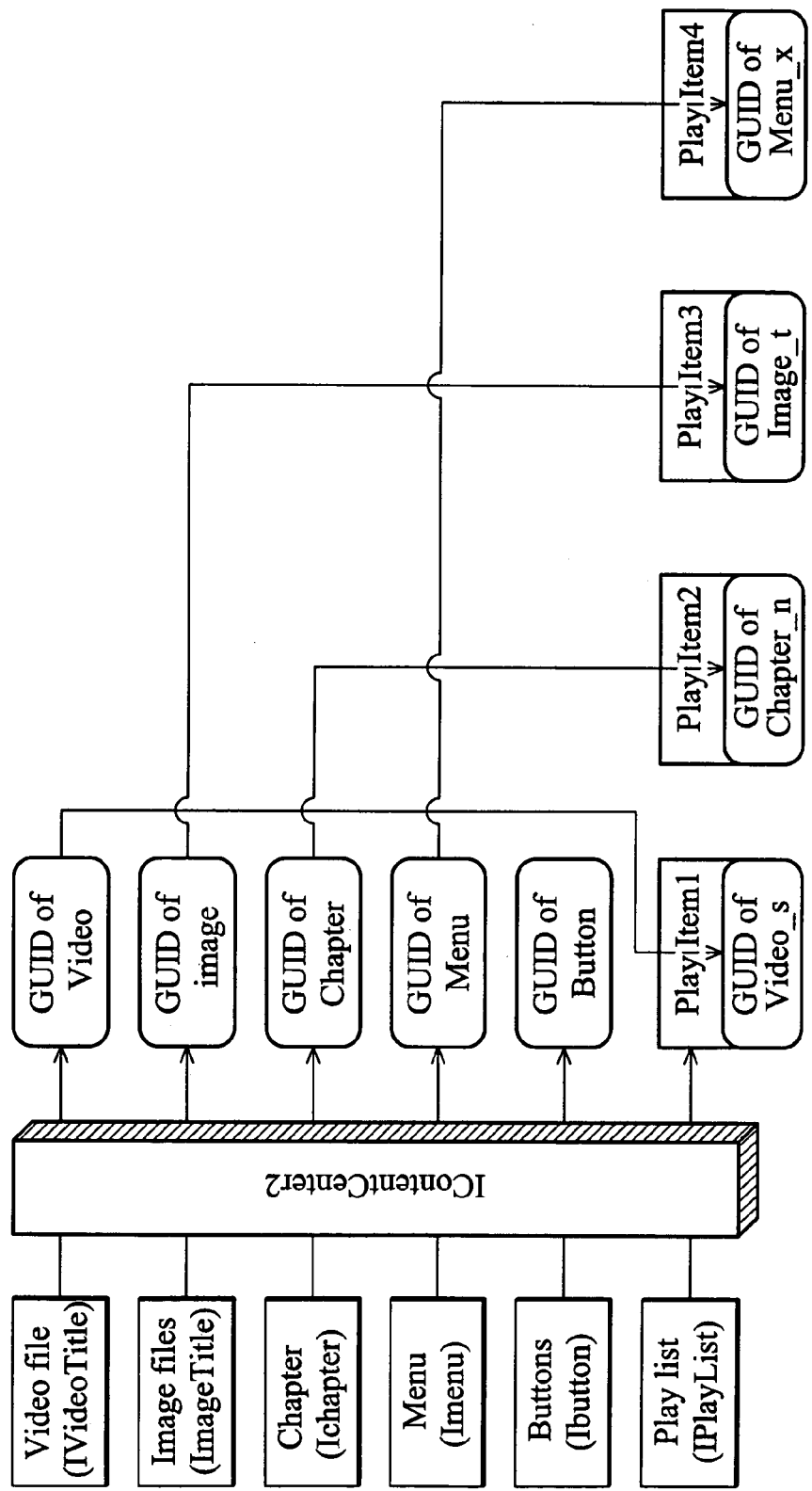
FIG. 1 is a schematic diagram of assigning the unique ID of the DVD content to each play item according to an embodiment of the present invention.

A video file comprises video, audio, image, and other multimedia objects, referred to as play items, linked as navigation paths using a user interface (UI) and software development kit (SDK). The invention improves both UI and SDK components for visual content authoring, by providing a simple and easy authoring interface in the UI component, and, in the SDK component, by packaging DVD/VCD/SVCD elements as needed for linking the described objects, to create a playlist, thus reducing development time and required system resources by eliminating redundant operations. A playlist is a sequence of play items linked to a menu button control. When a menu button control is activated, play items run according to their arrangement in the playlist. Play items can be inserted in a playlist and each play item is associated with DVD disc content by assigning the unique ID of the DVD content to the play item, as shown in FIG. 1.

The UI component of an embodiment of the invention enables creation of playlists comprising navigation paths linking to video clips, such as title, chapter, menu, and menu button controls. Control of an internal index comprising items, such as audio streams, sub-picture streams and angles, is also provided. An embodiment of the invention also provides additional controls to loop the entire playlist or portions thereof.

Thus, each menu button control for a DVD/VCD/SVCD disc links to a playlist, and play items can be defined inside a playlist, with the number of both playlist and play items limited by DVD specification to about 640000 items for a DVD-5 disc. Each play item represents media content, a special flag, or a special command for changing the DVD internal index. Once the button control is activated, the playlist is loaded and each play item is played in a defined order.

The SDK component of an embodiment of the present invention for building DVD navigation paths provides an abstract layer based on DVD/VCD/SVCD specifications. The abstract layer utilizes a playlist to provide a uniform interface for configuring the DVD/VCD/SVCD navigation sequence, and the implemented SDK then translates the playlist to raw DVD commands or the playlist/select list of a VCD/SVCD. The abstract layer eliminates the need for knowledge of DVD/VCD/SVCD specifications.

An embodiment of the invention additionally provides a special PGC layout based on the DVD specification to implement the playlist architecture, and, VCD/SVCD content is mapped to corresponding playlists and select lists defined by the VCD/SVCD specifications. The invention provides a virtually unlimited number of playlist and unlimited play items through the special PGC layout, and allows an entire playlist or portions thereof to be looped.

The number of special PGCs in Video Manager Menu (VMGM) and all Video Title Set Menus (VTSMs) is determined according to video clips. The video clip comprises title, chapter, menu, and button controls, and special control flags. A special PGC is provided in the VTSM of the first VTS for switching of the DVD internal index. Additionally, a maximum of 128 commands can be used in a PGC according to the DVD specification, and a maximum of three commands can be used in a PGC of a title for DVD+VR specification.

Figure 2:
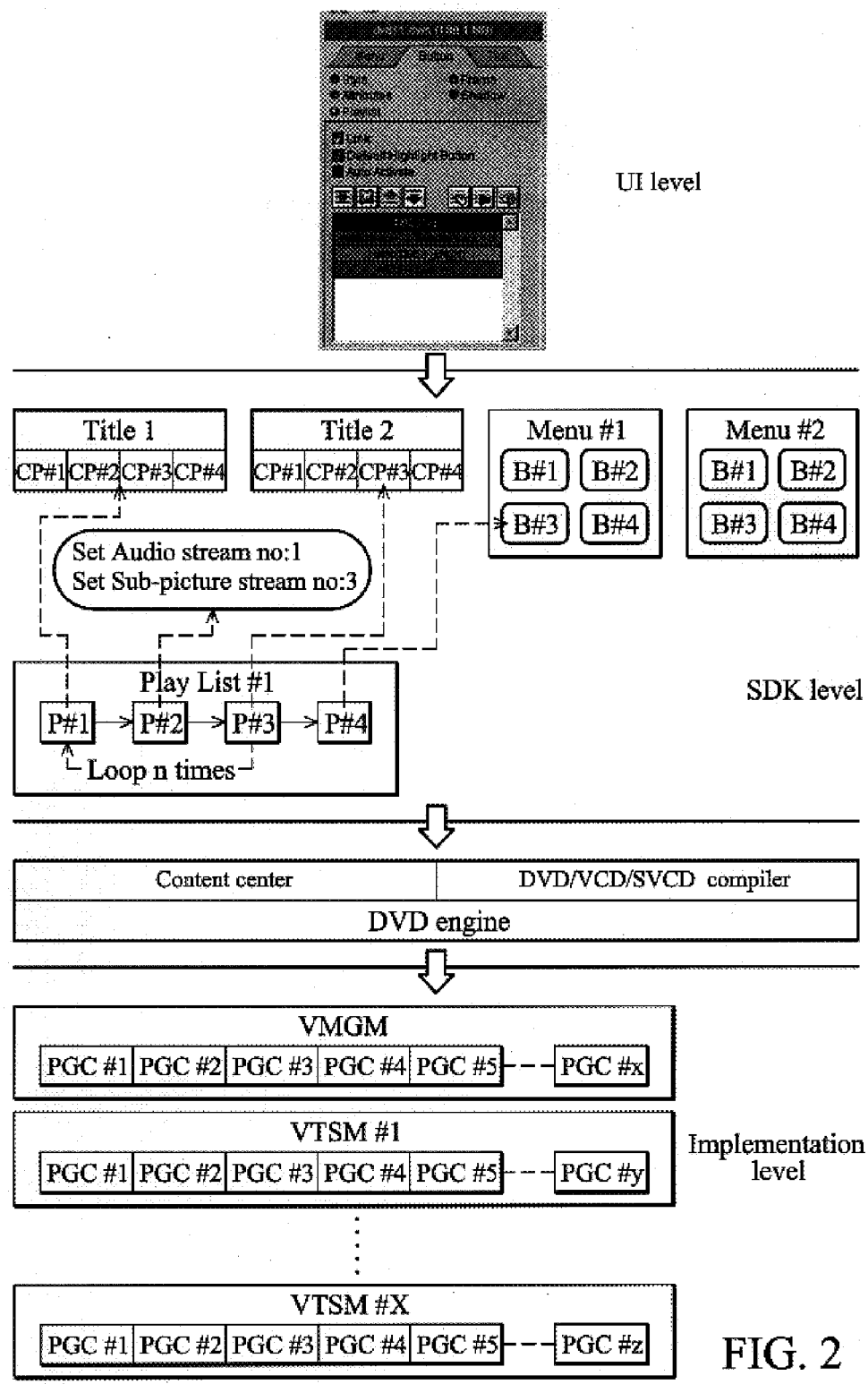
FIG. 2 is a schematic diagram of the architecture of the authoring interface of an embodiment of the present invention.

FIG. 2 is a schematic diagram showing the architecture of the visual content authoring system of the present invention.

The architecture comprises a UI, a SDK, and implementation levels. On the UI level, the UI provides an interface containing options and other information about a selected project, clip, menu, or button. Video settings and objects are adjusted and customized respectively using the interface. Media, such as titles, image files, menus, audio files and others, are collected on the UI level, and the navigation path is then defined in the SDK level.

As shown in SDK level of FIG. 2, a playlist may comprises many play items and each play item can be a title, a chapter, a button, or a menu (CP#1 refers to the first chapter of title 1, P#2 refers to the second play item, and B#3 refers to the third button of menu 1). The first play item (P#1), for example, links to title 1, the second play item (P#2) represents a video setting, the third play item (P#3) links to the third chapter (CP#3) of title 2, and the fourth play item (P#4) refers to the third button of menu 2. All linkages between media objects form a navigation path.

Figure 3:
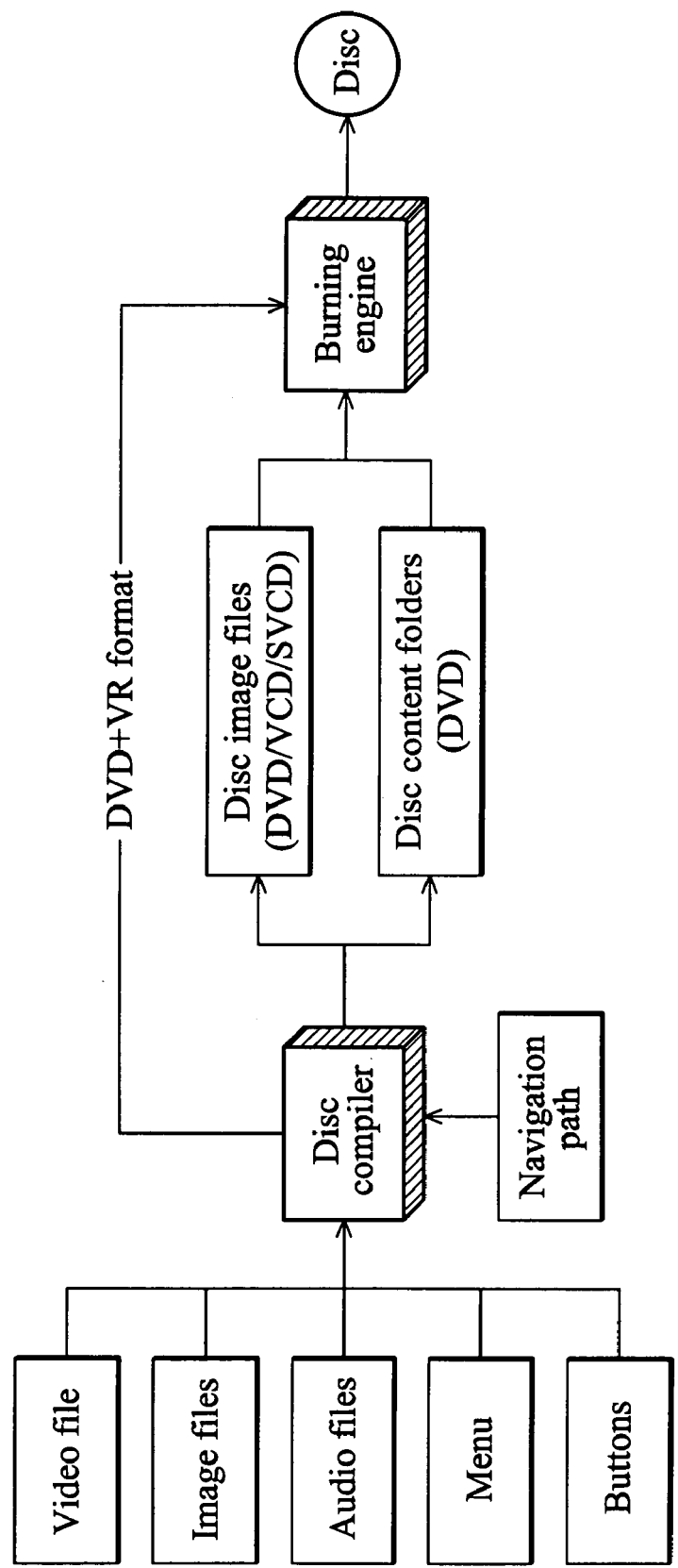
FIG. 3 is a workflow of the method for visual content authoring of an embodiment of the present invention.

Next, as shown in FIG. 3, the media objects and navigation path are compiled to be a disc image file or disc content folders.

A DVD-compliant disc contains files necessary for playback of DVD-Video, and comprises one Video Manager (VMG) and multiple Video Title Sets (VTS). The VMG controls one or more VTSs and VMGM and the VTS is a collection of titles and VTSM controlling 1 to 99 titles. VMGM menus are typically used when selection of more than one VTSM in a different title set is required, as one VTSM cannot jump to another VTSM in a different title set.

VMGM is used to navigate between two different VTSs. One VTS may contain a feature film and another may contain a documentary on the film, and the VMGM allows viewers to select which one they want to watch. PGC is a collection of programs, or groups of cells, linked together to create a sequential presentation. In the VMGM of the present invention, the following describes the architecture of PGCs, from PGC #1 to PGC#n (PGC #x, means the xth PGC in the VMGM).

PGC#1 contains commands to jump to the first menu of VMGM when the "Title menu" plays.

PGC#2 contains commands to regulate a special DVD index, comprising an audio stream, sub-title, and angle indexes, for VMGM, executed to jump to a VTS for checking PGC.

PGC#3~PGC#s extends the total number of commands of a PGC of a title, where s is calculated by the total number of titles inserted to the content center.

PGC#(s+1) ~PGC#(s+m) for each menu comprise visual content (the menu visible to users).

PGC#(s+m+1)~PGC#(s+m+v) are used to jump to the title menu of the correct VTS space from each play item, where v is calculated by the total number of VTSs.

PGC#(s+m+v+1)~PGC#(s+m+v+u) are used to jump to the correct visual menu (a PGC with visual content) of the VMGM from each play item, where u is calculated based on the total number of visual menus.

PGC#(s+m+v+u+1)~PGC#(s+m+v+u+t) are used to implement the commands used for each playlist, where t is calculated based on the total number of commands used by all playlists.

Each VTSM includes a plurality of PGCs, which are described in the following.

PGC#1~PGC#w are used to jump to correct title of the VTS, where w is calculated based on the total titles of the VTS.

PGC#(w+1)~PGC#(w+c) are used to jump to the correct chapter for the VTS, where c is calculated based on the total chapter of all titles of the VTS.

PGC#(w+c+1) contains commands to regulate the index of the audio stream, sub-picture stream and angle for the first VTS only.

The following is an embodiment of creating a new project, wherein the "Edit" step is first performed without captured media.

Figure 4:
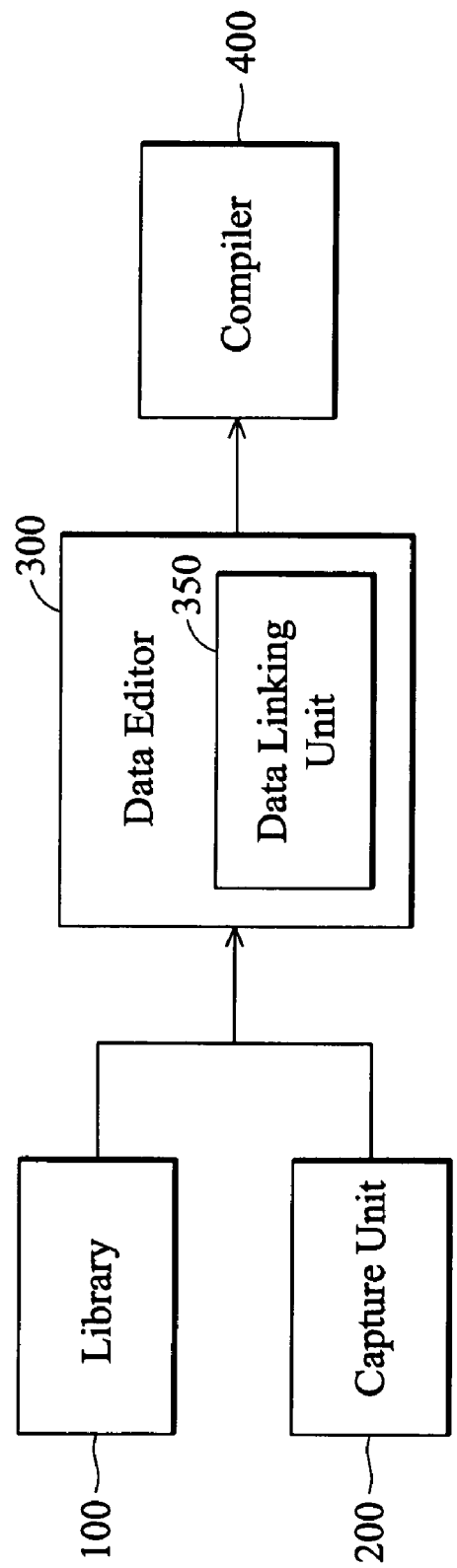
FIG. 4 is a schematic diagram of the architecture of the system for visual content authoring of an embodiment of the present invention.

FIG. 4 is a schematic diagram of the architecture of the system for visual content authoring of the present invention.

The architecture comprises a library 100, a capture unit 200, a data editor 300, further comprising a data linking unit 350, and a compiler 400. Library 100 stores media objects, such as audio, image, video files, and others as digital visual data files in any suitable standard format. Capture unit 200 captures video data from a video device, such as a video camera. Data editor 300 obtains required play items from library 100 or capture unit 200 and generates a playlist and a navigation path is then defined according to the play items and the playlist.

Each play item is associated with one video clip by assigning a unique ID of the video clip to the play item. The playlist is translated to raw DVD commands or a playlist/select list conforming to the VCD/SVCD specifications. The navigation path links a menu button to a menu, a button, a title, a chapter, or a media object. Compiler 400 compiles the media objects and the navigation path to generate a disc image file, including a plurality of video clips, each comprising a plurality of PGCs with an unlimited number of playlists and play items.

Figure 5:
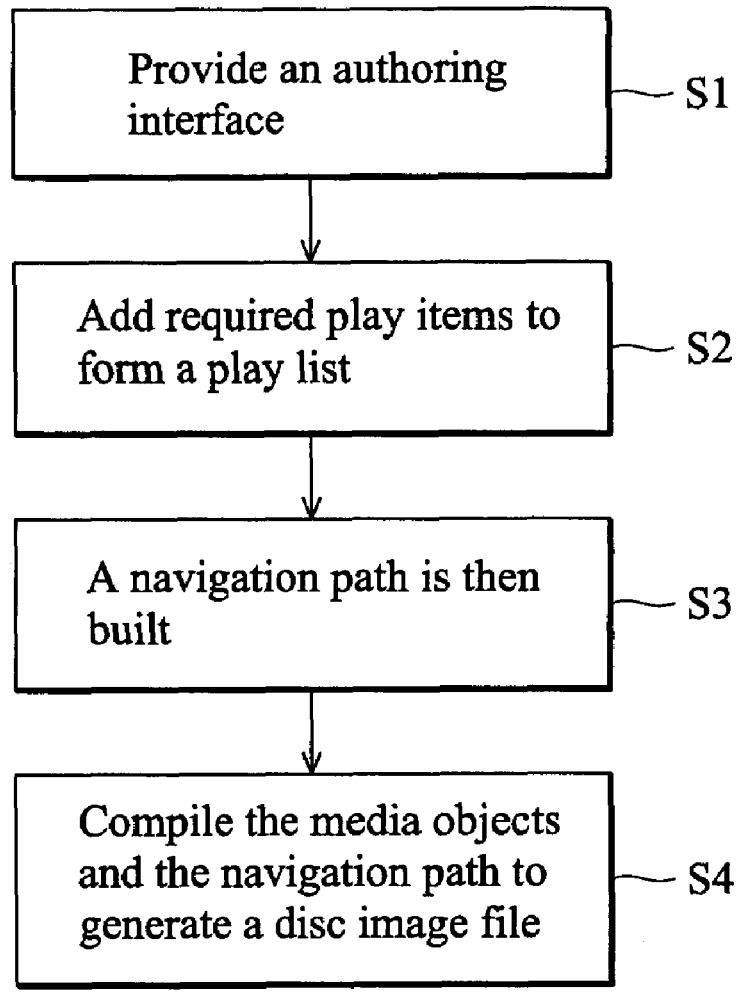
FIG. 5 is a flowchart of the method for visual content authoring of an embodiment of the present invention.

FIG. 5 is a flowchart of the method for visual content authoring of the present invention.

In step S1, an authoring interface, comprising a plurality of button controls, is first provided.

In step S2, required play items are added using the button controls to generate a playlist.

In step S3, a navigation path is then built according to the play items and the playlist.

In step S4, the media objects and the navigation path are compiled to generate a disc image file, including a plurality of video clip, each comprising a plurality of PGCs with an unlimited number of playlists and play items.

Figure 6:
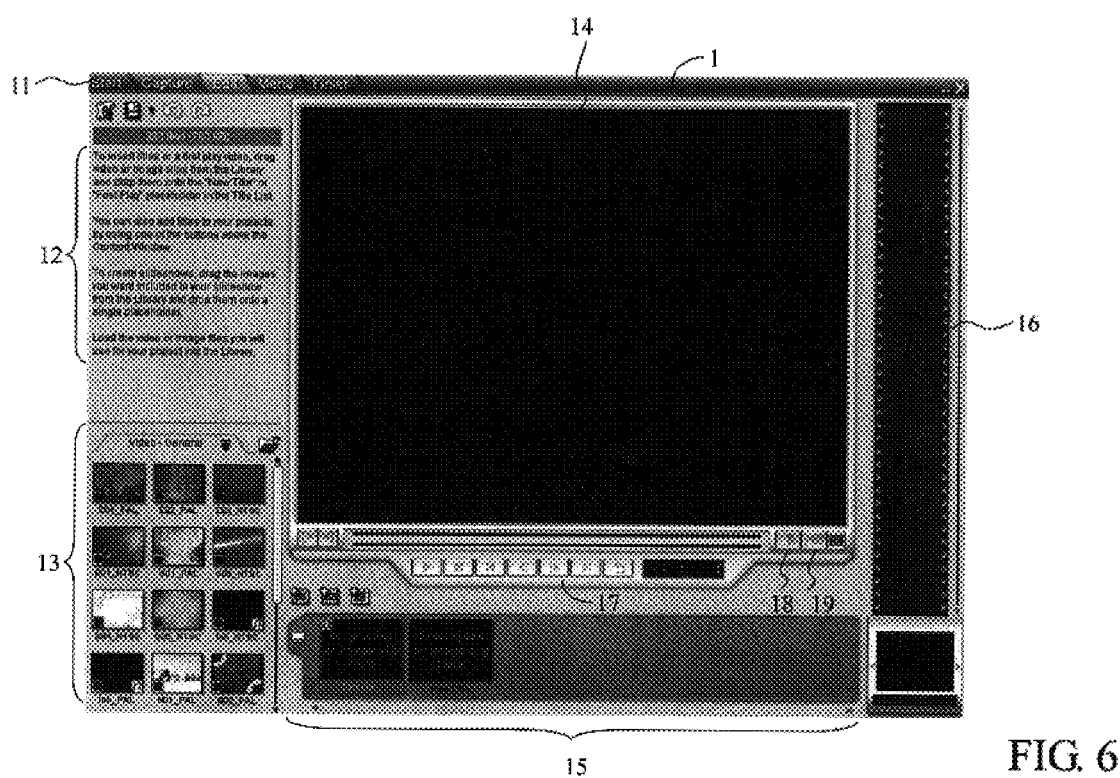
FIG. 6 is a schematic diagram of the authoring interface for visual content authoring of an embodiment of the present invention.

FIG. 6 is a schematic diagram of the authoring interface for the "Edit" step of visual content authoring of an embodiment of the present invention. A user interface 1 comprises a step panel 11, an option panel 12, a library 13, a preview window 14, a content window 15, a chapter list 16, a navigation panel 17, an add chapter button 18, and a subtitle/audio track button 19.

Step panel 11 displays buttons used to go to different steps for creating projects. Option panel 12 includes options and other information about a selected project, clip, menu, or button, and is used to adjust video settings and customize objects. Library 13 contains all media clips, either captured or imported from other file sources, and ready-to-use buttons, menu templates, and frame presets. Preview window 14 displays titles, acts as workspace for creating menus, or previews a created project depending on the current step.

Content window 15 displays the title list in the "Capture" and "Edit" steps, and, when in the "Menu" step, also displays the menu list along with the title list. Chapter list 16 displays the chapters of a selected title, and, when creating a slideshow, shows the images included in the slideshow title. Navigation panel 17 includes buttons used to go through a clip, and, in the "Capture" step, acts as the device control for the DV device. Add chapter button 18 inserts the currently displayed frame to the chapter list. Subtitle/audio track button 19 switches different audio and/or sub-title tracks when a project is previewed.

Figure 7:
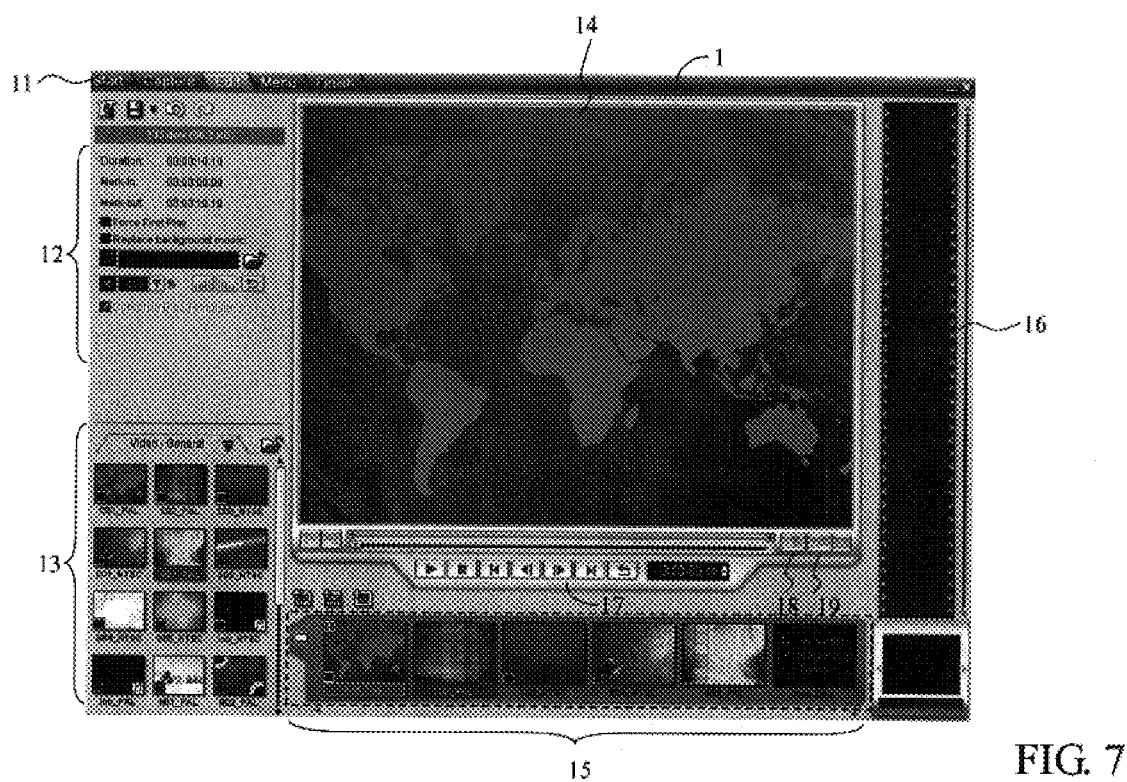
FIG. 7 is a schematic diagram of dragging, from a library, and dropping media objects in a content window for the "Edit" step of an embodiment of the present invention.
Figure 8:
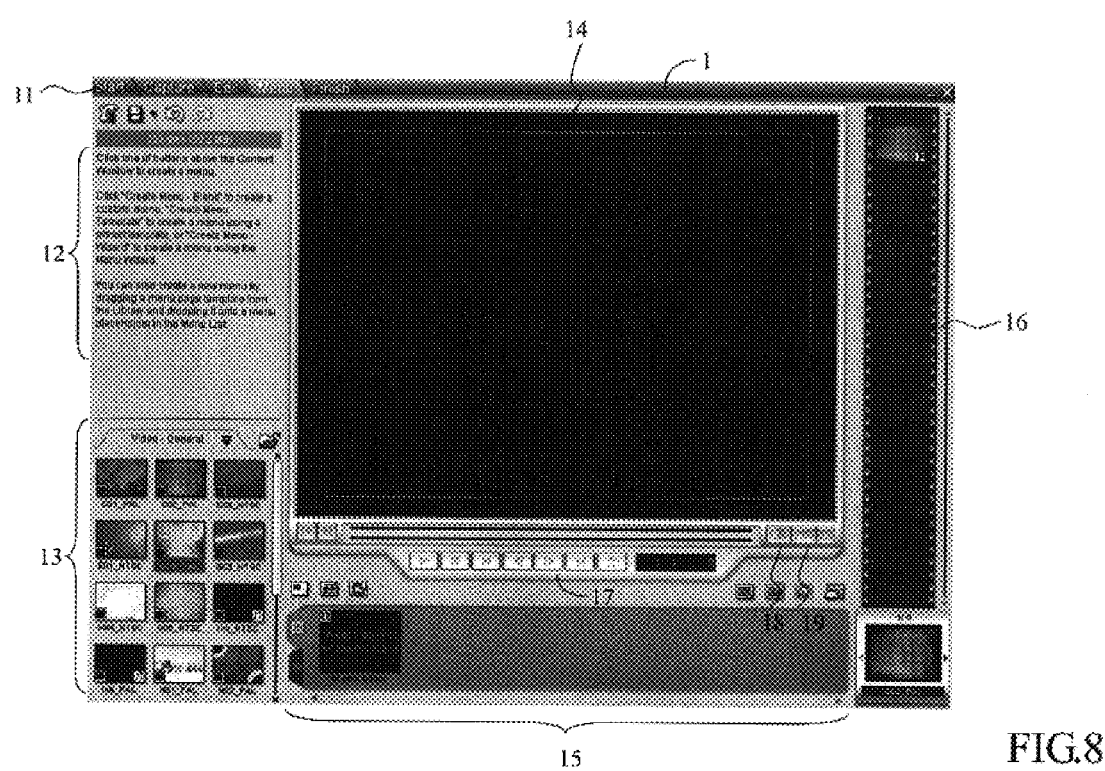
FIG. 8 is a schematic diagram of the user interface for the "Menu" step of an embodiment of the present invention.
Figure 9:
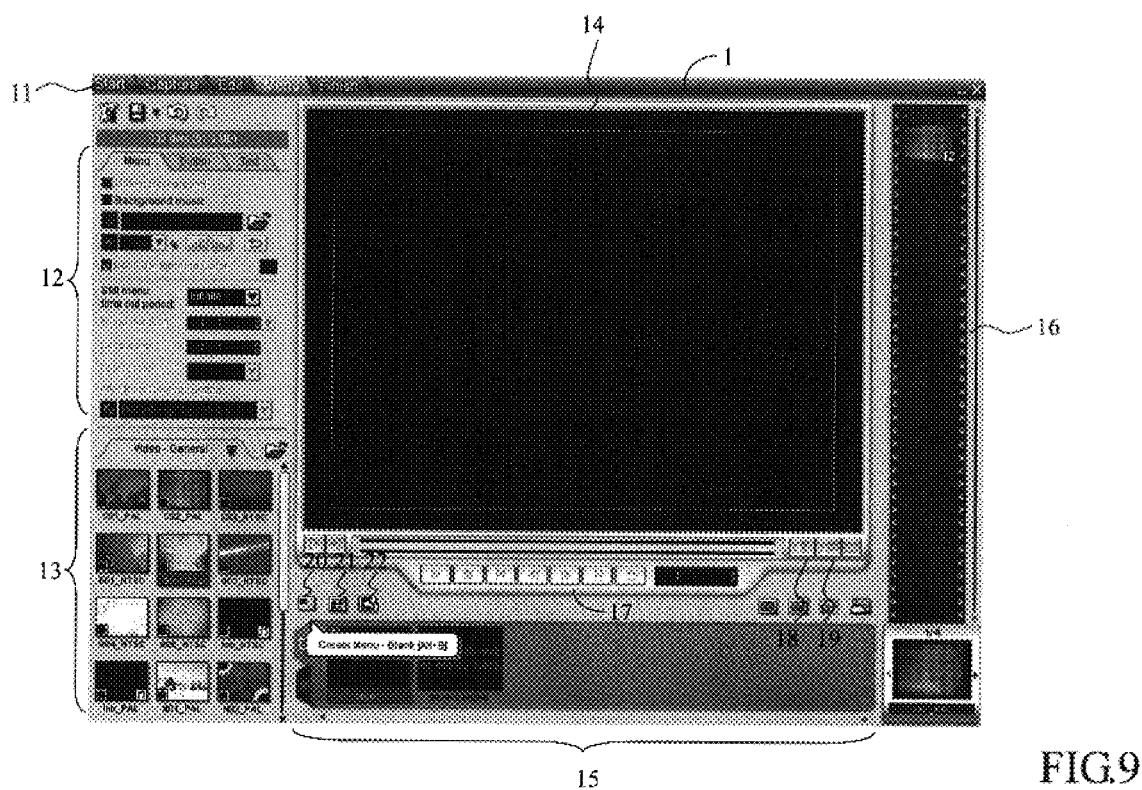
FIG. 9 is a schematic diagram of the user interface for creating a menu using button controls of an embodiment of the present invention.
Figure 10:
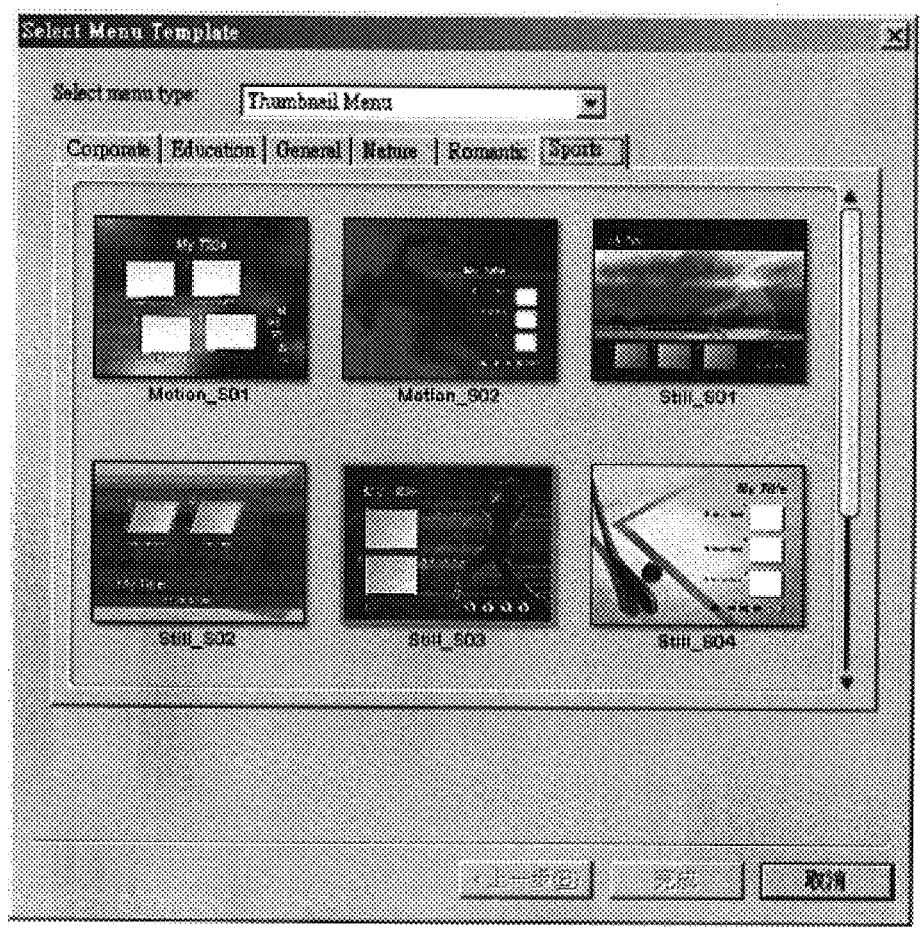
FIG. 10 is a schematic diagram of creating the menu with templates of an embodiment of the present invention.
Figure 11:
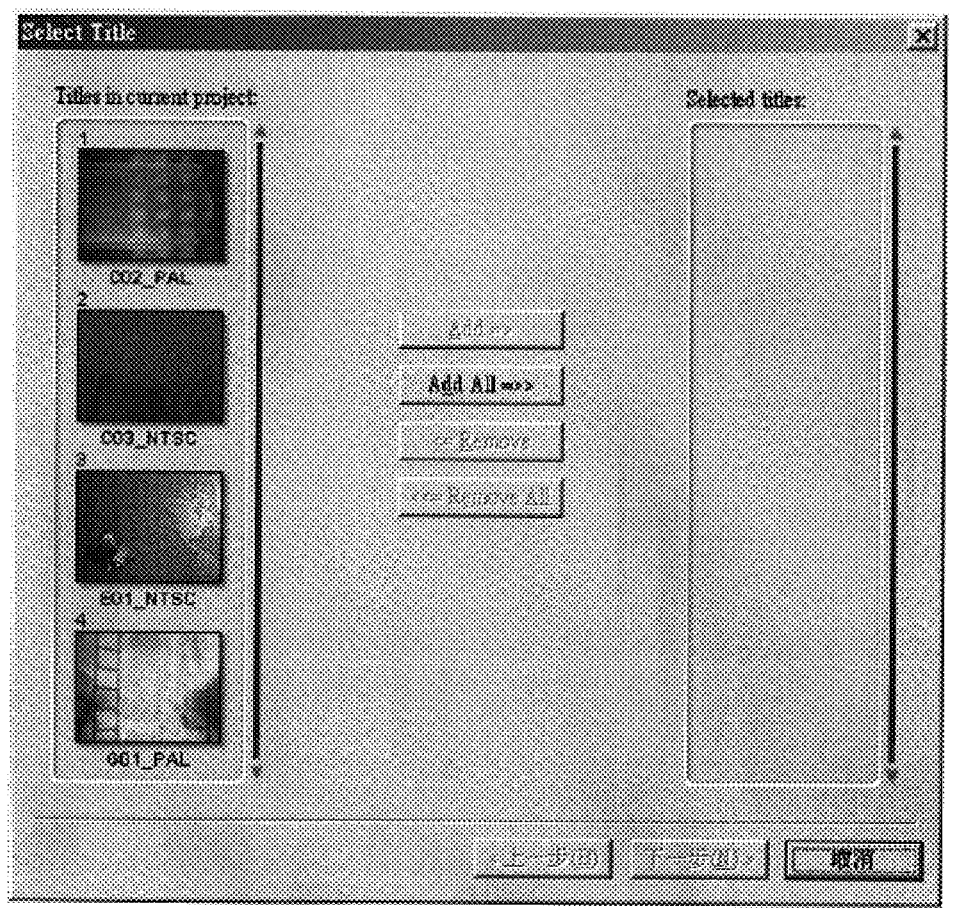
FIG. 11 is a schematic diagram of creating the menu with the wizard of an embodiment of the present invention.

Required media objects are dragged from library 13 and dropped in content window 15, as shown in FIG. 7, and the process then goes to the "Menu" step after the Edit operation is complete. In the "Menu" step, content window 15 further displays the menu list, as shown in FIG. 8. A menu can be created with blank window using a button 20 and all menu elements, such as buttons, titles, and other objects, are dragged from library 13, the title list, and chapter list 16, displayed in preview window 14, as shown in FIG. 9. A menu can also be created with templates using a button 21, the templates chosen from a list of preset menu templates, as shown in FIG. 10. A menu can be further created with a wizard using a button 22, as shown in FIG. 11.

Figure 12:
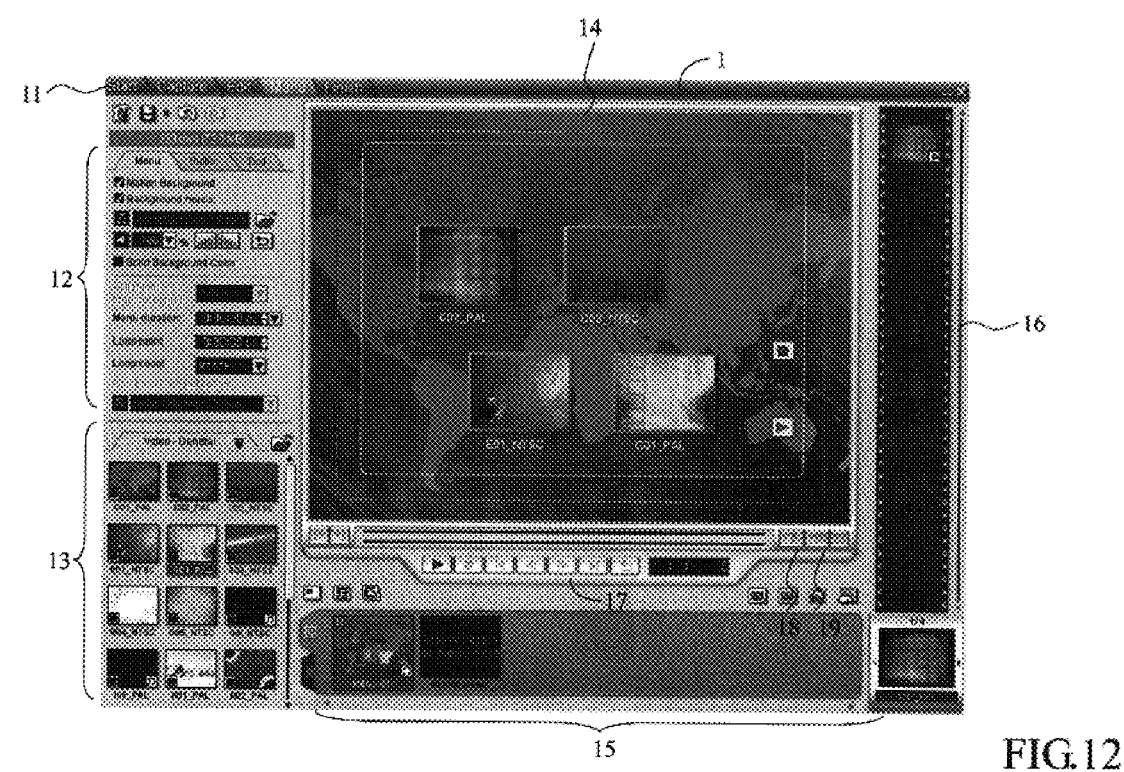
FIG. 12 is a schematic diagram of a created menu of an embodiment of the present invention.
Figure 13:
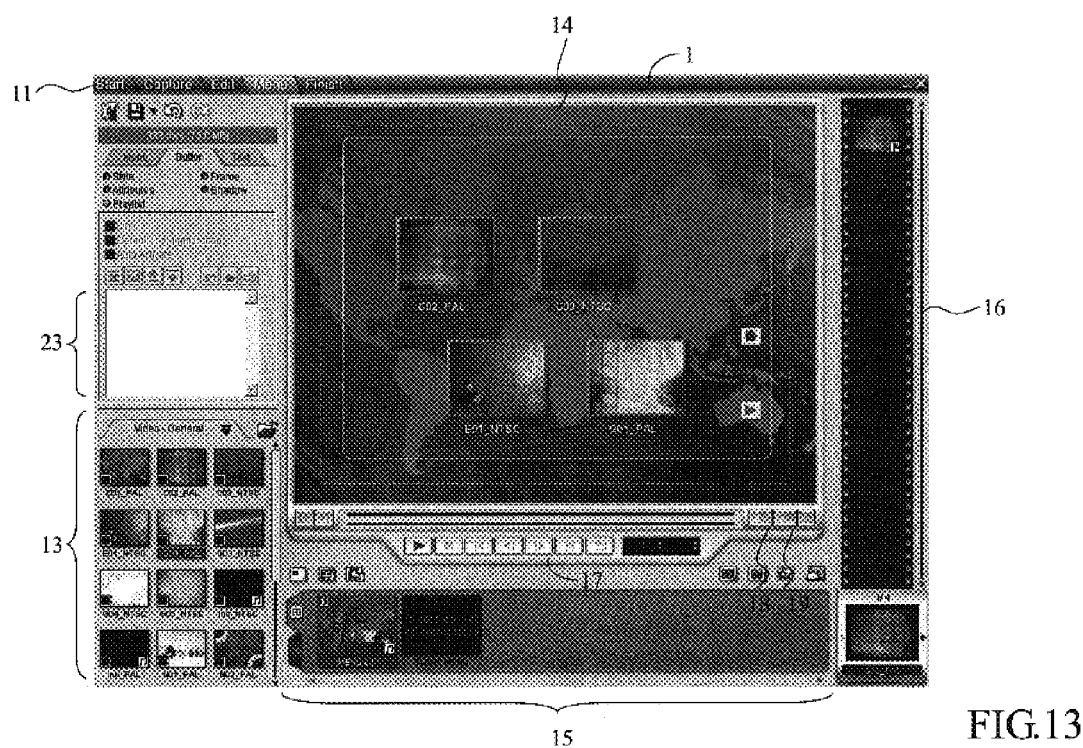
FIG. 13 is a schematic diagram of the user interface with a playlist window for the "Menu" step of an embodiment of the present invention.
Figure 14:
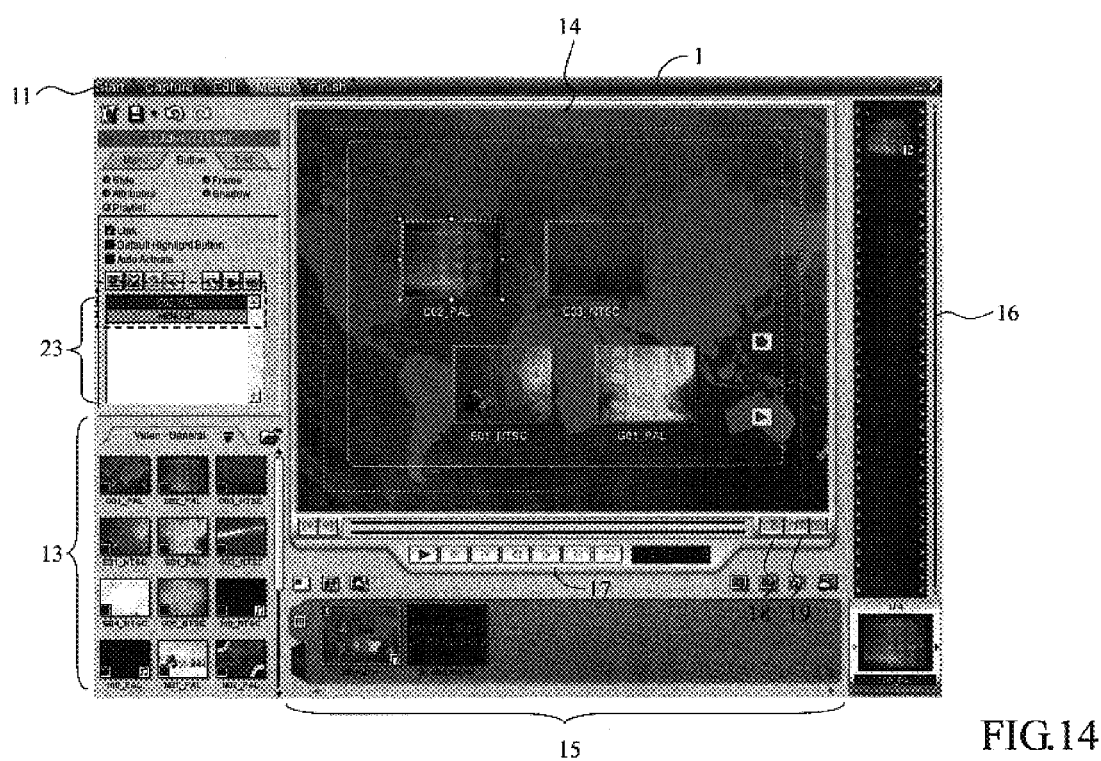
FIG. 14 is a schematic diagram showing the playlist of a selected media object of an embodiment of the present invention.
Figure 15:
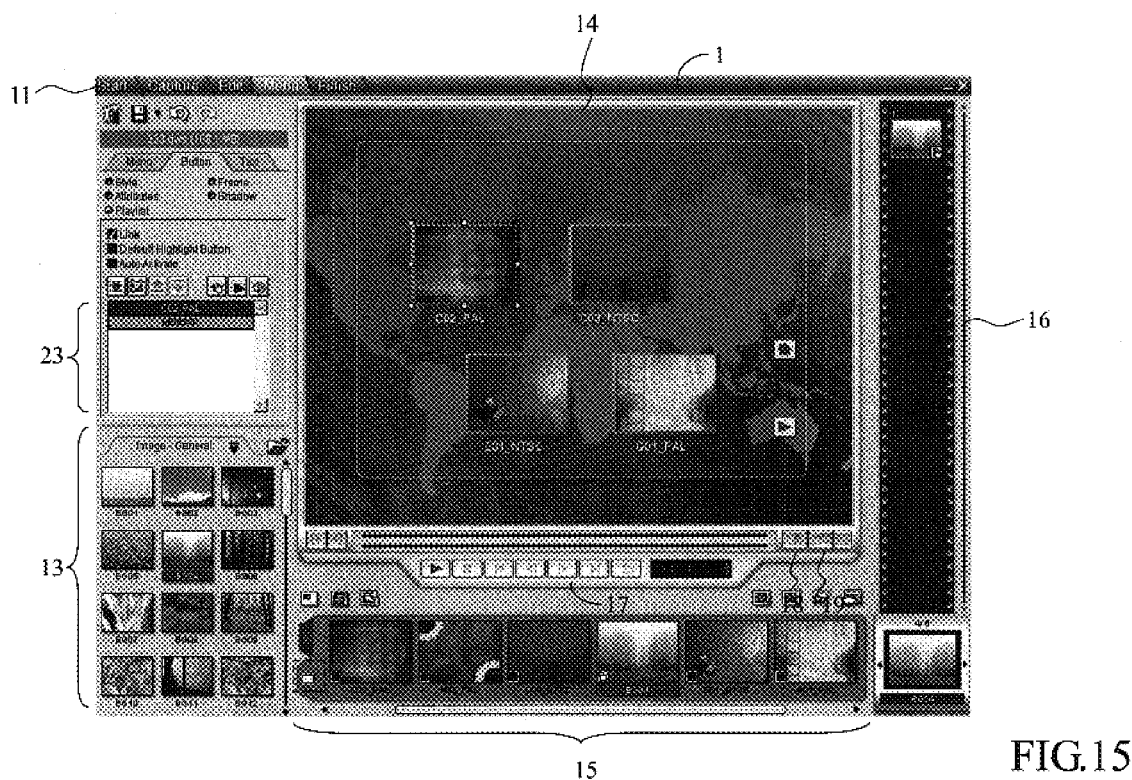
FIG. 15 is a schematic diagram showing the title list in the content window of an embodiment of the present invention.
Figure 16:
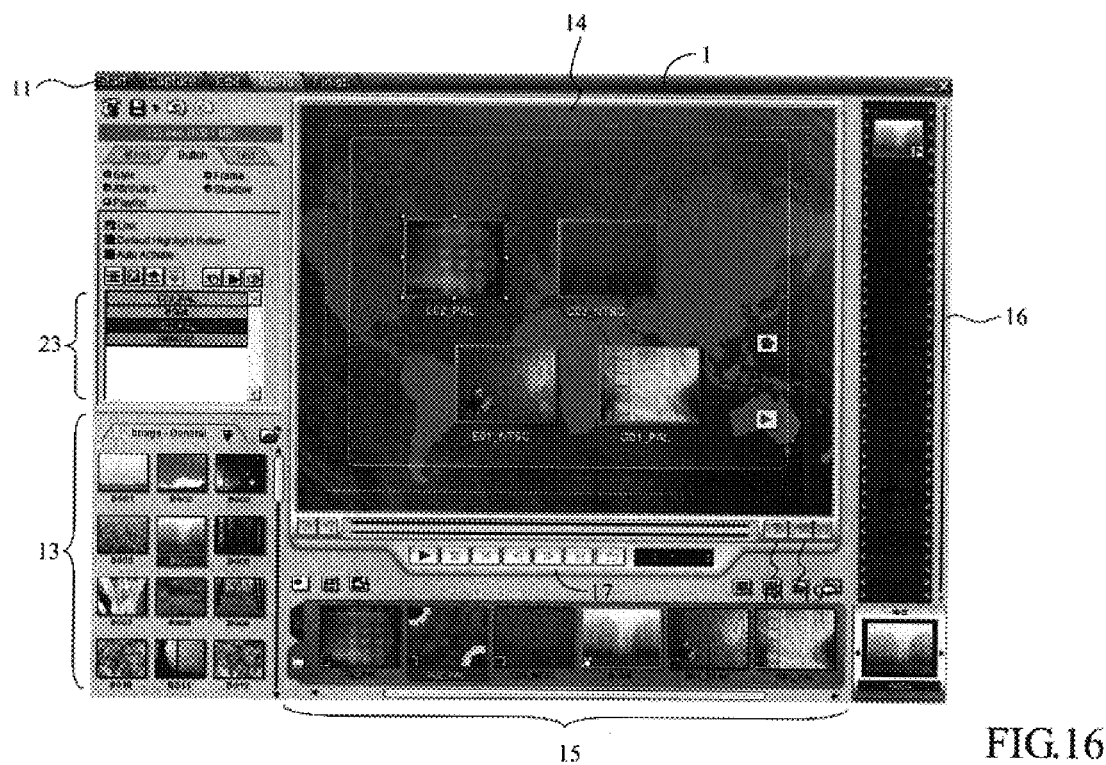
FIG. 16 is a schematic diagram of dragging, from the title list, and dropping media objects in the playlist window according to an embodiment of the present invention.

The following describes a menu created with templates. First a template is chosen from preset menu templates shown in FIG. 10, the created menu is displayed in the menu list in content window 15, as shown in FIG. 12. Next, the button tag in option panel 12 is selected and the playlist option is selected, displaying a playlist window 23, as shown in FIG. 13. A media object in the created menu is clicked, displaying a corresponding playlist shown in playlist window 23 and the chapter shown in chapter list 16, as shown in FIG. 14. The "MENU-01" play item is played after the "C02-PAL" play item, referring to play back of the created menu. Next, content window 15 displays the title list, as shown in FIG. 15, for dragging and dropping other titles in the playlist window 23, as shown in FIG. 16. In addition, when a menu in the menu list is dragged and dropped in playlist window 23, a popup menu comprising text "Add menu" and "Add button from a menu" (not shown) options is displayed. If users select "Add menu", the last play item is replaced with the menu. If users select "Add button from a menu", a popup button selection window is displayed, and the last play item is replaced with the selected button.

Figure 17:
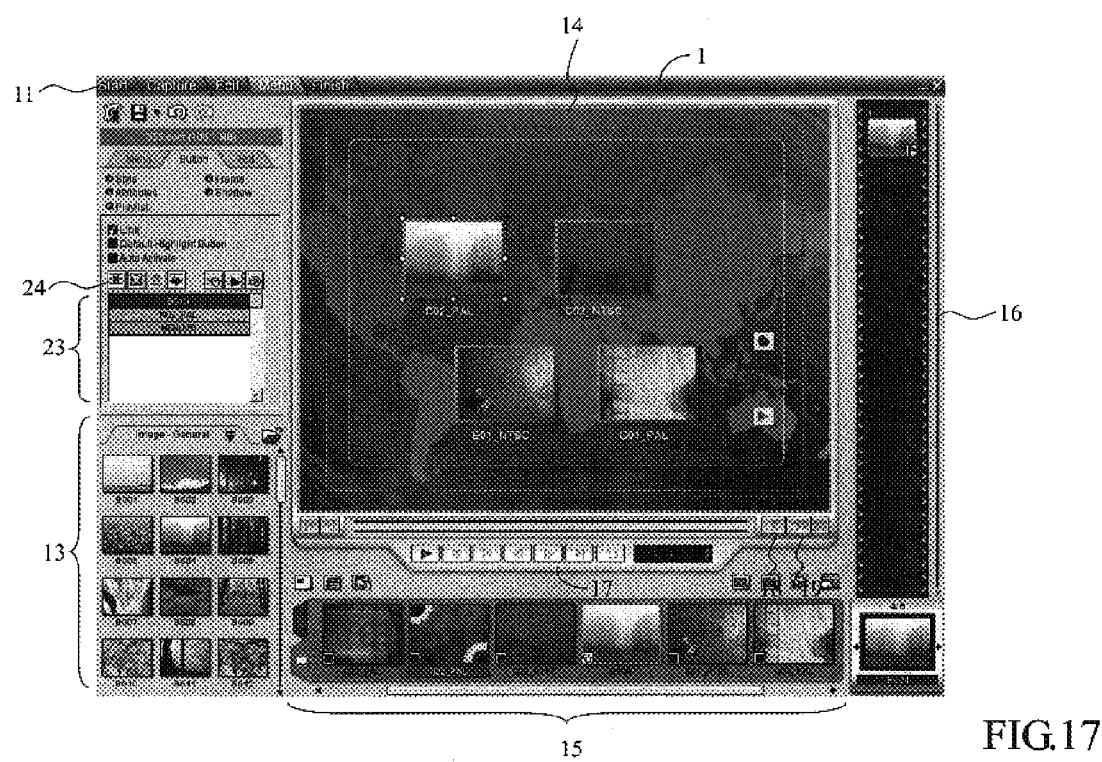
FIG. 17 is a schematic diagram of removing one media object in the playlist window according to an embodiment of the present invention.
Figure 18:
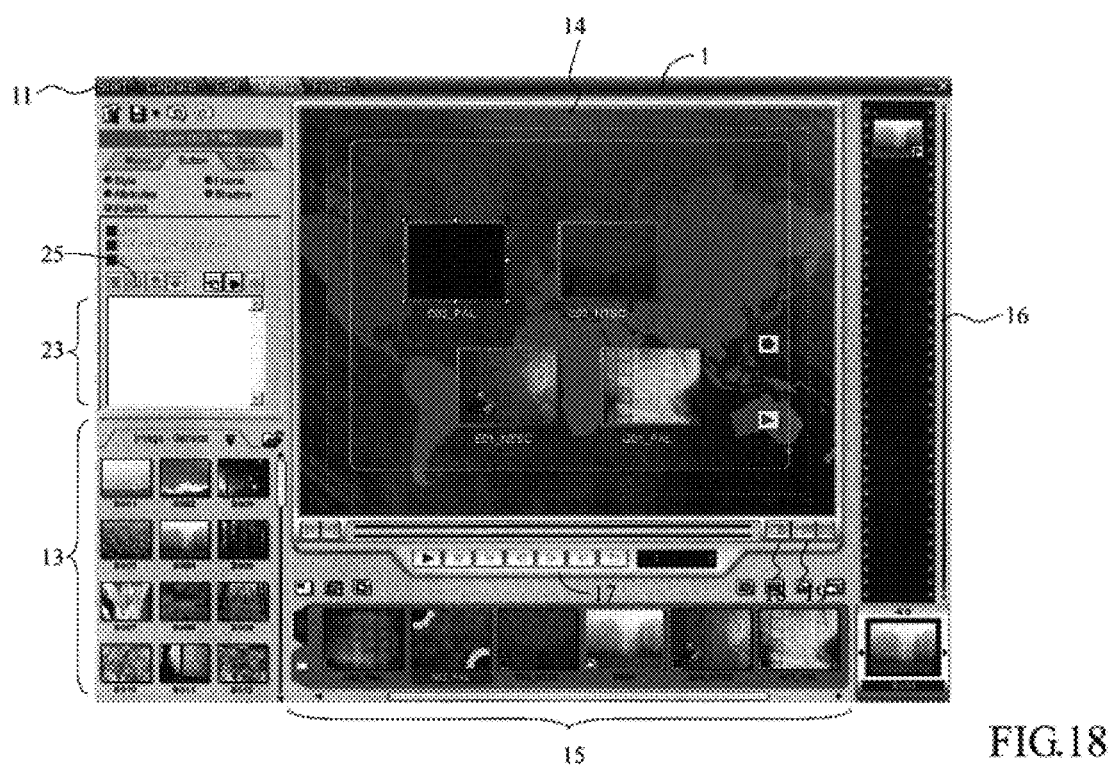
FIG. 18 is a schematic diagram of removing all media objects in the playlist window according to the present invention.
Figure 19:
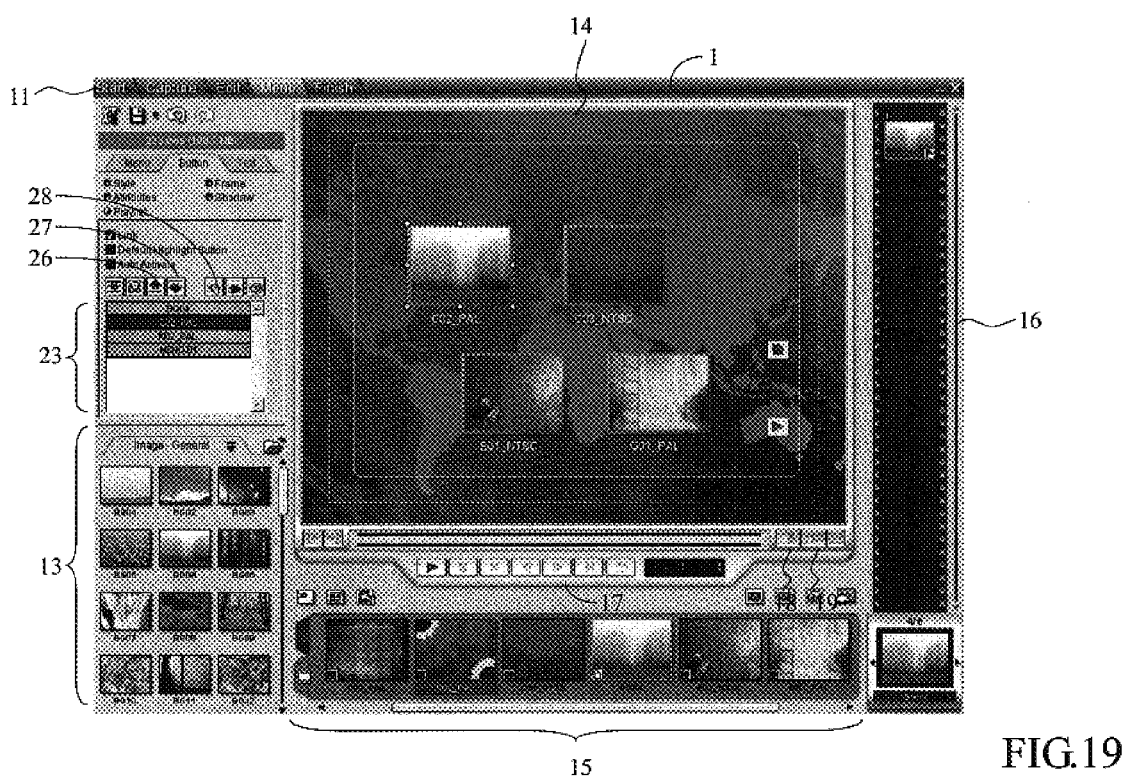
FIG. 19 is a schematic diagram of moving a selected play item one-step up and down according an embodiment of to the present invention.
Figure 20:
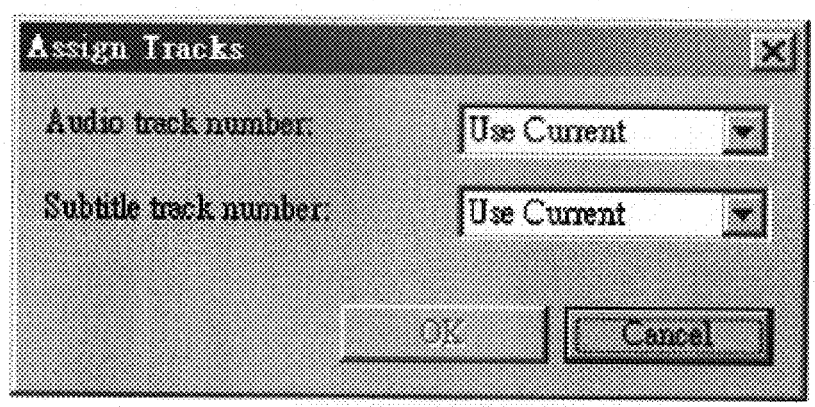
FIG. 20 is a schematic diagram of assigning a different subtitle and/or audio track to a selected play item according to an embodiment of the present invention.
Figure 21:
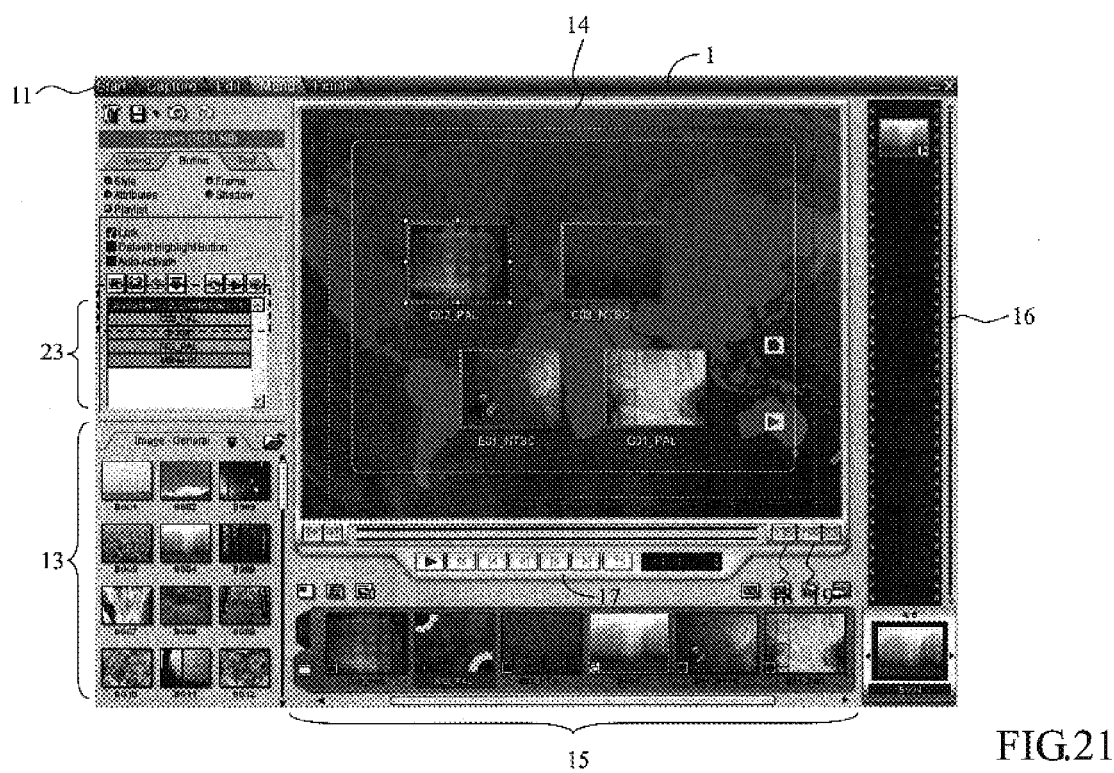
FIG. 21 is a schematic diagram of inserting a track item in front of a selected track item according to an embodiment of the present invention.
Figure 22:
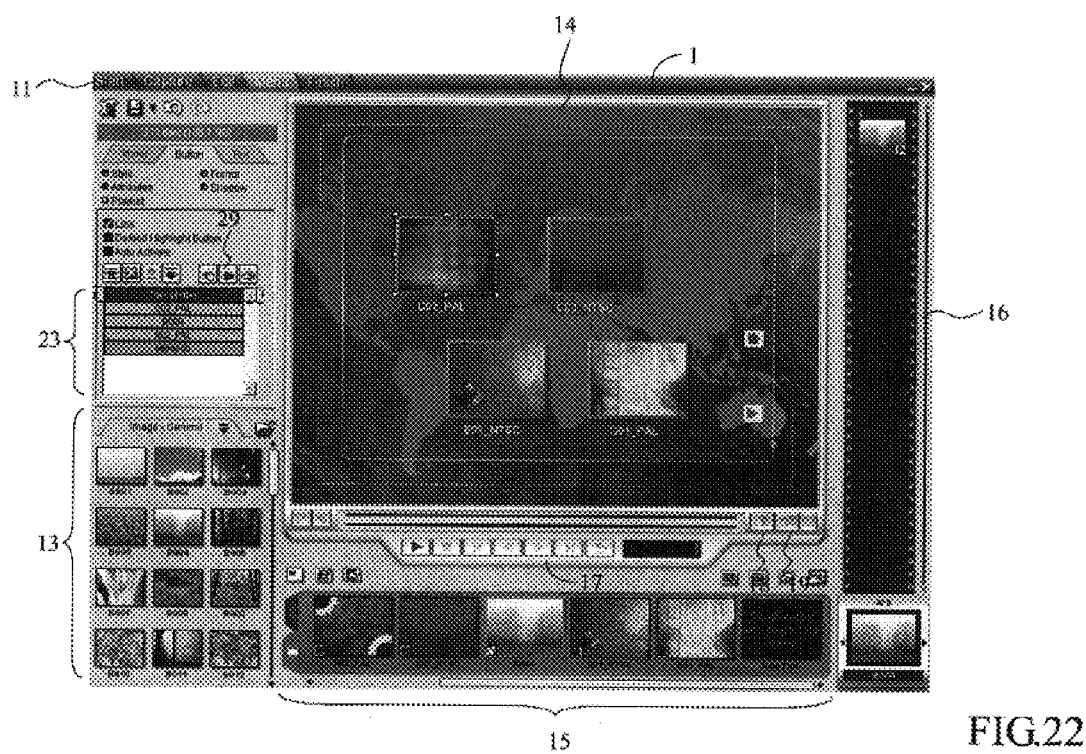
FIG. 22 is a schematic diagram of inserting an add-play-all-titles item in the playlist window according to an embodiment of the present invention, inserting all titles in the title list.
Figure 23:
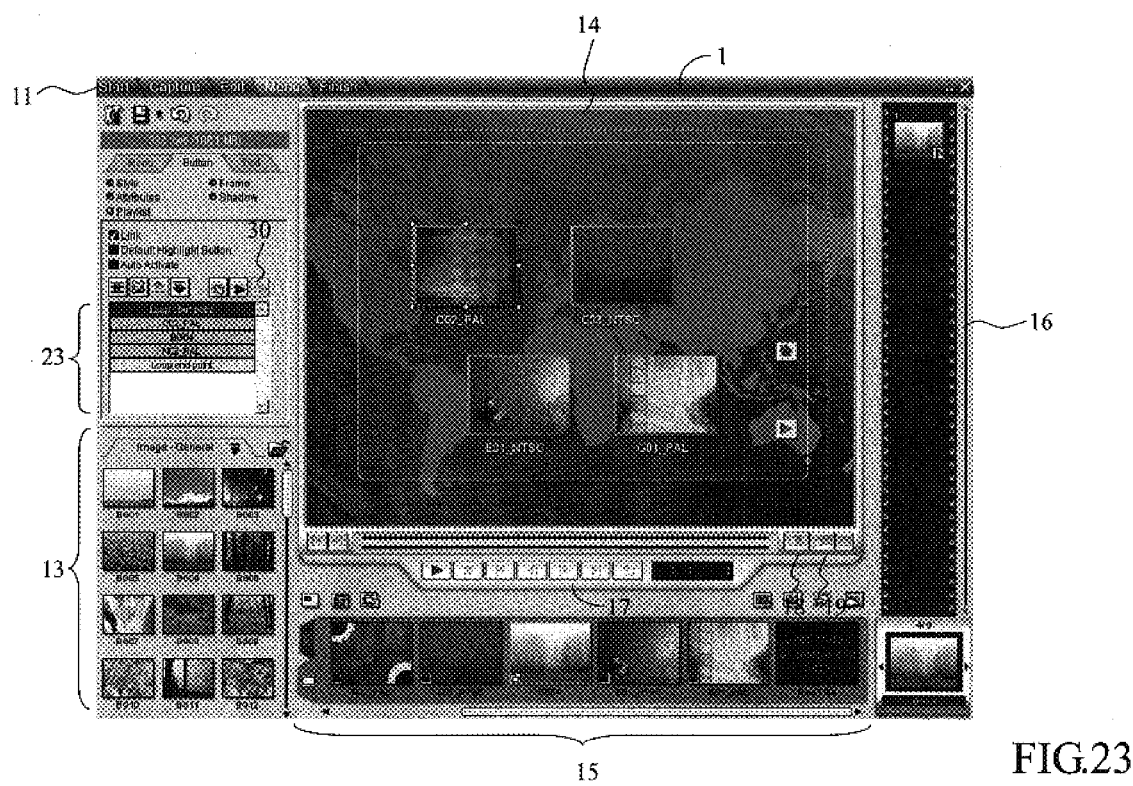
FIG. 23 is a schematic diagram of inserting an add-start-and-end-loop-points item in the playlist window according to an embodiment of the present invention, repeating the sequence of play items.

A remove button 24 removes a selected item from playlist window 23, clicked to remove the "C02-PAL" play item, as shown in FIG. 17. A remove-all button 24 removes all play items from playlist window 23, as shown in FIG. 18. Move down and up buttons 26 and 27 move the selected play item one-step up and down, respectively, in playlist window 23, as shown in FIG. 19. An assign tracks button 28 assigns a different subtitle and/or audio track to the selected play item, clicked to display a dialog box, as shown in FIG. 20, for setting tracks, and then inserting a track item in playlist window 23, as shown in FIG. 21. An add-play-all-titles button 29 inserts all titles in the title list to playlist window 23, as shown in FIG. 22. An add-start-and-end-loop-points button 30 automatically repeats the sequence of play items and the loop start point is inserted anywhere in playlist window 23 as long as it has at least one play item to repeat, as shown in FIG. 23. The described controls can also be executed by mouse commands.

Figure 24:
FIG. 24 is a schematic diagram of a preview window with a remote control panel of an embodiment of the present invention.
Figure 25:
FIG. 25 is a schematic diagram of playing the "First Play" play item shown in FIG. 7 in the preview window according to the present invention.
Figure 26:
FIG. 26 is a schematic diagram of playing the menu item shown in FIG. 12 in the preview window according to an embodiment of the present invention.

The "Finish" step in step panel 11 is performed when all media objects are properly arranged and set, and preview window 14 displays the title, menu, or chapter selected using a remote control panel 31, as shown in FIG. 24. Next, the play/pause button in remote control panel 31 is clicked to preview the created project, first playing the "First Play" play item shown in FIG. 7, as shown in FIG. 25, and then playing the "MENU-01" play item, as shown in FIG. 26. As described above, a video project is thus created and is then burned to a videodisc using a burn control.

The invention enables creation of DVD/VCD/SVCD navigation paths without requiring knowledge of DVD/VCD/SVCD specifications, provides an interface adding media objects and generating a playlist, and links to play items corresponding button controls provided by the interface using the packaged common object models (COM) to reduce development time and system resources.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for visual content authoring, comprising the steps of:
   providing an authoring interface, having a plurality of button controls;
   adding play items to generate a playlist;
   building a navigation path according to the play items and the playlist, the navigation path linking a menu object to a content object; and
   compiling the play items and navigation path to generate a disc image file, including a plurality of video clips, wherein each video clip includes PGCs with at least one play item representing a control flag for determining the number of the PGCs.

2. The method as claimed in claim 1, wherein each play item is a menu, a menu button, a title, a chapter, or a media object.

3. The method as claimed in claim 2, wherein the media object is a video, image, slideshow, audio, or an input as digital visual data in any suitable standard format.

4. The method as claimed in claim 1, wherein the play items are added using the button controls or any other click operations.

5. The method as claimed in claim 1, wherein the content object is a menu, a button, a title, a chapter, or a media object.

6. The method as claimed in claim 1, wherein each video clip includes PGCs with an unlimited number of playlists and play items.

7. The method as claimed in claim 1, wherein the playlist is translated to raw DVD commands or a playlist/select list conforming with VCD/SVCD specification.

8. The method as claimed in claim 1, wherein the authoring interface provides a control item to loop all or some play items in the playlist.

9. The method as claimed in claim 1, wherein the authoring interface provides control items to change internal indexes of one video clip, and the indexes include audio and sub-picture streams and angles.

10. The method as claimed in claim 1, wherein each play item is associated with one video clip by assigning a unique ID of the video clip to the play item.

11. A user interface for visual content authoring, comprising:
    a preview window, displaying required play items;
    a content window, displaying a title list and menu list;
    a playlist window, displaying a sequence of the play items; and
    a plurality of button controls,
    wherein, the play items are dragged from the title or menu list and dropped in the playlist window using the button controls to generate a playlist, a navigation path is built according to the play items and the playlist, the navigation path linking a menu object to a content object, and the play items and navigation path are compiled to generate a disc image file, including a plurality of video clips, wherein each video clip includes PGCs with at least one play item representing a control flag for determining the number of the PGCs.

12. The user interface as claimed in claim 11, further comprising a library, storing media objects.

13. The user interface as claimed in claim 11, wherein each video clip includes PGCs with an unlimited number of playlists and play items.

14. The user interface as claimed in claim 11, wherein the playlist is translated to raw DVD commands or a playlist/select list complying with VCD/SVCD specifications.

15. The user interface as claimed in claim 11, wherein the authoring interface provides a control item to loop all or some play items in the playlist.

16. The user interface as claimed in claim 11, wherein the authoring interface provides control items to change internal indexes of one video clip, and the indexes includes audio and sub-picture streams and angles.

17. The user interface as claimed in claim 11, wherein each play item is associated with one video clip by assigning a unique ID of the video clip to the play item.

18. The user interface as claimed in claim 11, further comprising a capture unit, capturing video files from external video devices to be acquired by the data editor.

* * * * *